United States Patent [19]

Packer, deceased et al.

[11] Patent Number: 5,348,751
[45] Date of Patent: Sep. 20, 1994

[54] DOUGH PRODUCT

[75] Inventors: Allan Packer, deceased, late of Bedford, England, by Vivien Packer, legal representative; Richard W. F. Yoell, Bedford, England

[73] Assignee: Unilever Patent Holdings B.V., Rotterdam, Netherlands

[21] Appl. No.: 530,443

[22] Filed: May 30, 1990

Related U.S. Application Data

[63] Continuation of Ser. No. 277,934, Nov. 30, 1988, abandoned.

[30] Foreign Application Priority Data

Nov. 30, 1987 [GB] United Kingdom ............... 8727971

[51] Int. Cl.⁵ .............................................. A21D 6/00
[52] U.S. Cl. ..................................... 426/94; 426/297; 426/501; 426/502; 426/503
[58] Field of Search .................. 426/93, 94, 297, 501, 426/502, 503, 556

[56] References Cited

U.S. PATENT DOCUMENTS

| | | | |
|---|---|---|---|
| 1,717,401 | 5/1922 | Perky . | |
| 2,305,712 | 12/1942 | Koefer | 426/501 |
| 2,726,156 | 12/1955 | Armstrong | 426/501 |
| 3,798,343 | 3/1974 | Vitale . | |
| 3,804,956 | 4/1974 | Bongiovanni | 426/344 |
| 3,904,772 | 9/1975 | Moegle | 426/293 |
| 4,276,317 | 6/1981 | Hoyashi | 426/501 |
| 4,645,673 | 2/1987 | Wilmes | 426/94 |

FOREIGN PATENT DOCUMENTS

| | | |
|---|---|---|
| 104743 | 4/1984 | European Pat. Off. . |
| 0104743 | 4/1984 | European Pat. Off. . |
| 0132363 | 7/1984 | European Pat. Off. . |
| 0193371 | 2/1986 | European Pat. Off. . |
| 0238682 | 3/1986 | European Pat. Off. . |
| 1026233 | 7/1963 | United Kingdom . |

OTHER PUBLICATIONS

The New International Confectioner, ed. by W. J. Fance, p. 862. 3rd Ed., 1976, Ebenezer Baylis and Son Ltd., London.

Primary Examiner—Donald E. Czaja
Assistant Examiner—Curtis E. Sherrer
Attorney, Agent, or Firm—Cushman, Darby & Cushman

[57] ABSTRACT

Method for preparing a dough product comprising the steps of:
(a) preparing a dough;
(b) forming one or more sheets of said dough into a layered body
(c) slicing the layered body in a direction transverse to the layers; and
(d) pressing the formed slice.

Preferably, the dough is a laminated dough. The product is preferably filled to obtain a pizza.

5 Claims, 2 Drawing Sheets

DOUGH PRODUCT

This is a continuation-in-part of application Ser. No. 07/277,934, filed on Nov. 30, 1988, which was abandoned upon the filing hereof.

The present invention relates to dough products and a method for their preparation. Specifically, the invention relates to filled dough products, in particular pizza products.

Dough products are generally wheat flour-based products which are usually prepared by producing a suitable dough composition, forming it into the desired shape and, optionally, at least partially setting the structure, e.g. by baking or frying. "Filled dough products" mean dough products to which a filling or topping is applied. Usually fillings or toppings comprise moist material, e.g. pizza sauce, which tends to migrate to the dough during storage rendering it soggy.

Palmier type dough products are usually prepared from a sheet of puff pastry material which is folded into a four-layer block and is subsequently sliced and baked.

Glazed currant rolls are usually prepared by spirally winding a sheet of a bread-type dough, upon which a currant filling has been applied, followed by slicing, baking and glazing.

Spirally wound, filled tubular dough products are described in EP 193 371 (Rheon Automatic Machinery Co. Limited). The product is prepared by spirally winding a sheet of dough and thereafter inserting a pipe into said wound dough product through which filling is introduced into the product.

It is an object of the present invention to provide a dough product which has an interesting texture as perceived by a consumer during consumption.

It is also an object of the invention to provide a filled or topped dough product in which moisture migration from the filling or topping to the dough is reduced.

It has been found that, by incorporating specific steps in the preparation of dough products, these objectives can be achieved.

The invention relates to a method for preparing a dough product comprising the steps of:
a) preparing a farinaceous dough;
b) forming one or more sheets of the dough into a layered body;
c) slicing the layered body in a direction transverse to the layers; and
d) pressing the formed slice.

The dough for use in the preparation dough products according to the invention can be any dough conventionally used in the preparation of dough products such as e.g. bread dough, pie dough, shortbread, cookie dough, etc.

Preferably, a laminated dough is used such as, for instance, French puff pastry, Dutch puff pastry, Danish pastry or croissant dough. Within the laminated doughs there is a preference for laminated doughs containing yeast or other leavening agents. Additionally, it is preferred to use a laminated dough which only comprises a small amount of fat, e.g. less than 25% by weight. It is also preferred to use a laminated dough which only contains a small number of fat layers, the number of fat layers being preferably less than 35, more preferably less than 10 and most preferably about 6.

Yeast-containing laminated doughs comprising less than 25% by weight fat and less than 10 fat layers are generally preferred.

Preferably, the dough contains a puff pastry laminating fat.

The dough is formed into sheets, each of which will usually have a thickness of less than 10 mm. Preferably the sheets have a thickness of between 2 and 6 mm and a width of between 1 and 100 cm, more preferably between 10 and 40 cm.

In a preferred embodiment, the dough sheets, before being formed into a layered body, are sprayed with water and/or dusted with flour. This reduces the risk of breakage along the planes of weakness between individual layers of dough in the dough product.

One or more of these sheets are formed into a layered body. A preferred way of accomplishing this involves spirally winding of one large sheet of dough to obtain a log shape of the type commonly known as "Swiss roll" but of larger scale. Another method for obtaining a layered body involves the zig-zag folding of a sheet of dough to obtain a horizontally layered block. Such a block can also be obtained by stacking a plurality of sheets of dough. Preferably the layered body is a cylindrical log shape. All of these methods need to avoid the exertion of excessive pressure on the product in order to avoid distortion of the layered body structure. Preferably a cross-section of the layered body will usually show between 10 and 100 layers, ideally between 30 and 100 layers.

The layered body is subsequently used to form slices. If desired, the body may be hardened prior to slicing, for instance by freezing the outer surface thereof, which is preferably effected by a carbon dioxide snow treatment.

It is important in the slicing to obtain a direction of the dough layers in the slice which is at a certain angle, preferably between 25° and 90°, most preferably between 45° and 90°, with respect to the surface produced by the slice. Most preferred is slicing in a direction substantially perpendicular to said dough layers. If, for instance, a "Swiss roll" type log shape is sliced perpendicularly, the slices obtained will have a spiral and circular structure and the dough layers will be substantially perpendicular to the surface produced by the slice.

After slicing, the dough slice is pressed to decrease its thickness and to obtain a slice having an increased upper surface area and a more compact structure. The pressing may, for instance, be carried out by blocking the slice but is preferably carried out by rolling the slice. Preferably, the upper surface area is at least increased by a factor of 1.5 during pressing. Most preferred is an increase in the upper surface area by a factor of between 2 and 10.

It is believed that during pressing major distortions of the layered structure can occur. These changes of structure, however, are believed to contribute positively to the quality of the final product. In this respect, when rolling is used as pressing technique, it is preferred to carefully control the direction of rolling. Preferably, this rolling only takes place in two directions perpendicular to each other.

Although the beneficial effects of pressing are not fully understood, it is believed that it effects adhesion of the layers to each other, thus giving an increased rigidity of the slice which minimises the risk of breakage along the planes of weakness between individual layers of dough in the dough product.

Furthermore, it is believed that the pressing of a slice, having its layers in a direction substantially perpendicular to the surface produced by the slice, will effect reorientation of the layers, thus giving slices in which the angle of inclination of the layers to the surface produced by the slice is reduced. Especially when the product is filled or topped, this could be advantageous in that the reorientation gives better retention of the topping on the surface and a reduced tendency to give soggy/slimy products after heating in preparation for consumption.

Preferably the pressed slices are proved under standard conditions, such as for 40 minutes, at 37.5° C. in an atmosphere with a relative humidity of 55%. An optional processing step after slicing, involves pre-setting of the dough structure prior to the application of the filling or topping. This pre-setting step may be effected in any conventional way. Most preferred is pre-baking or pre-frying of the dough slice.

As stated before, filled or topped products are the preferred food products according to the invention. These are preferably obtained by applying a filling or topping to a pre-set, pressed slice. Most preferred is the preparation of a pizza by applying a pizza topping to the slice which functions as a base. It is believed that the fat in the laminated dough acts as a moisture barrier and thereby helps prevent transfer of moisture from the pizza topping or filling to the dough base.

Another optional step in the preparation of dough products according to the invention is the reforming of the pressed slice. In the case of a spirally wound slice, this can be accomplished by bending the edge of the pressed sheet upwards, thus obtaining a cup-shaped, spirally wound product.

The dough products prepared according to the invention will usually be packed in an outer wrapping and substantially frozen.

The dough products prepared according to the invention are prepared for consumption by heating in a conventional or microwave oven. If a microwave oven is used it is preferred that the dough product comprises a dough sheet which was fully baked before the filling or topping was applied.

Several advantageous modifications of the above-described process are possible, such as the use of more than one type of dough, for instance one containing yeast and one that is laminated, which form alternating layers when formed into a layered body.

It is also possible to interleave other food material between the layers of the dough, e.g. sauce, fish comminute, vegetables, meat, etc. This can for instance be accomplished by applying an edible substance to the sheet of dough prior to body formation. Alternatively flavouring materials can be added to the fat prior to the preparation of the dough.

The method according to the invention can be used to prepare products having widely varying sizes, and in respect of circular products widely varying diameters. The diameter of the final dough product depends on the diameter of the layered body. When the method is used to prepare a pizza product, it is preferred to form a dough slice having a diameter of from 10 to 25 cm. However, it is also possible to use the method to prepare dough slices with a diameter of less than 10 cm.

A device for carrying out the above-described method will include one or more units for forming the layered body. Preferably this device will effect spiral winding of one or more sheets of dough. A difficulty which arises in the rolling of sheets is that known devices either only effect a few windings or effect a very tight winding which gives rise to a deformed product. In carrying out the method according to the invention, there exists therefore a need for a device which is capable of winding a sheet of food material without the above-mentioned disadvantages.

It was found that such a device should preferably comprise a conveyor belt for moving the sheet of dough and a coil initiator which effects initial winding which is subsequently finalised by additional coiling equipment.

A coil initiator preferably comprises grip elements for gripping the moving sheet of dough. During movement of the belt, a number of grip elements will co-operate, to initiate coiling of the dough. A preferred embodiment of a coil initiator comprises a flexible, stainless steel chain mail, having chain links, which is arranged above the conveyor belt. The leading edge of the chain mail extends in the direction of movement of the belt and is supported at a short height above the belt. Such a device operates as follows. A sheet of dough passes under the leading edge of the chain mail and is picked up and forced to begin to coil by the chain links in contact with the belt. As the belt conveys more of the dough sheet under the chain mail, further rolling takes place.

After passing the coil initiator, the coiled dough is further wound by additional coiling equipment. This coiling equipment can, for instance, be composed of a further belt located above the first conveyor belt and moving in the opposite direction thereto. A preferred coiling equipment is, a roller located above the conveyor belt which rotates in the opposite direction to the direction of movement of the belt.

The invention will be further illustrated by means of the following figures and examples.

Figure 2:
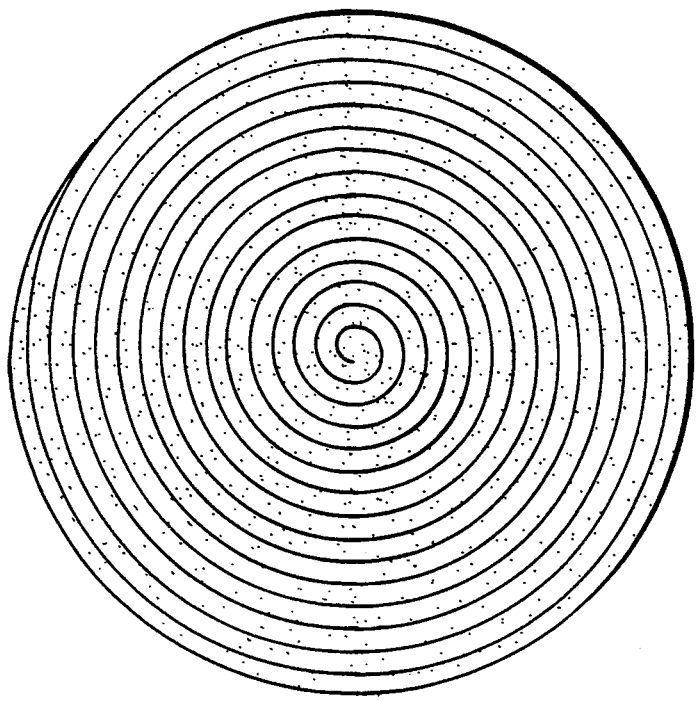
FIG. 2 is a plan view of the same slice after flattening by rolling, proving and pre-baking.
Figure 1:
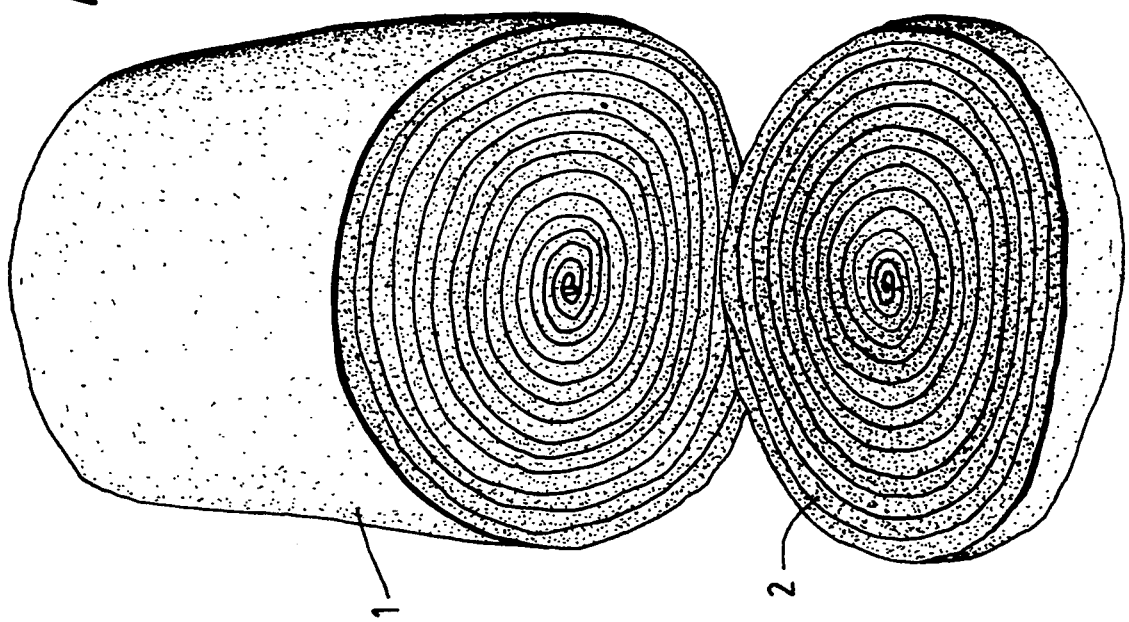
FIG. 1 is a perspective view of a spirally wound body 1 of laminated pastry and a spiral slice 2 which has been cut from the body.
Figure 3:
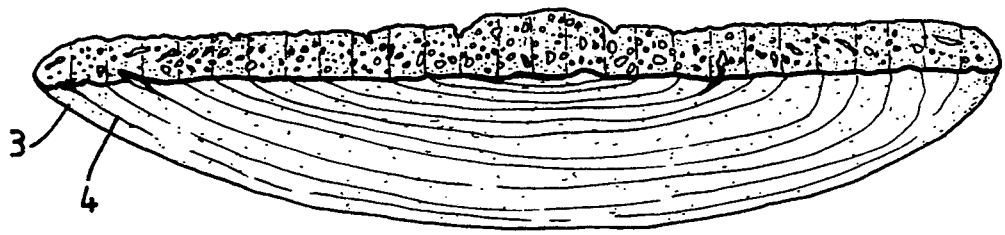
FIG. 3 is a perspective cross-sectional view showing a slice of laminated dough after it has been rolled, proved, baked and cut.

Referring to FIG. 3, the layers of dough 3 in the product can be seen. Between the individual layers of dough are planes of weakness 4. Slices of dough as shown are in FIGS. 1, 2 and 3 are particularly suitable for use as a pizza base.

Figure 4:
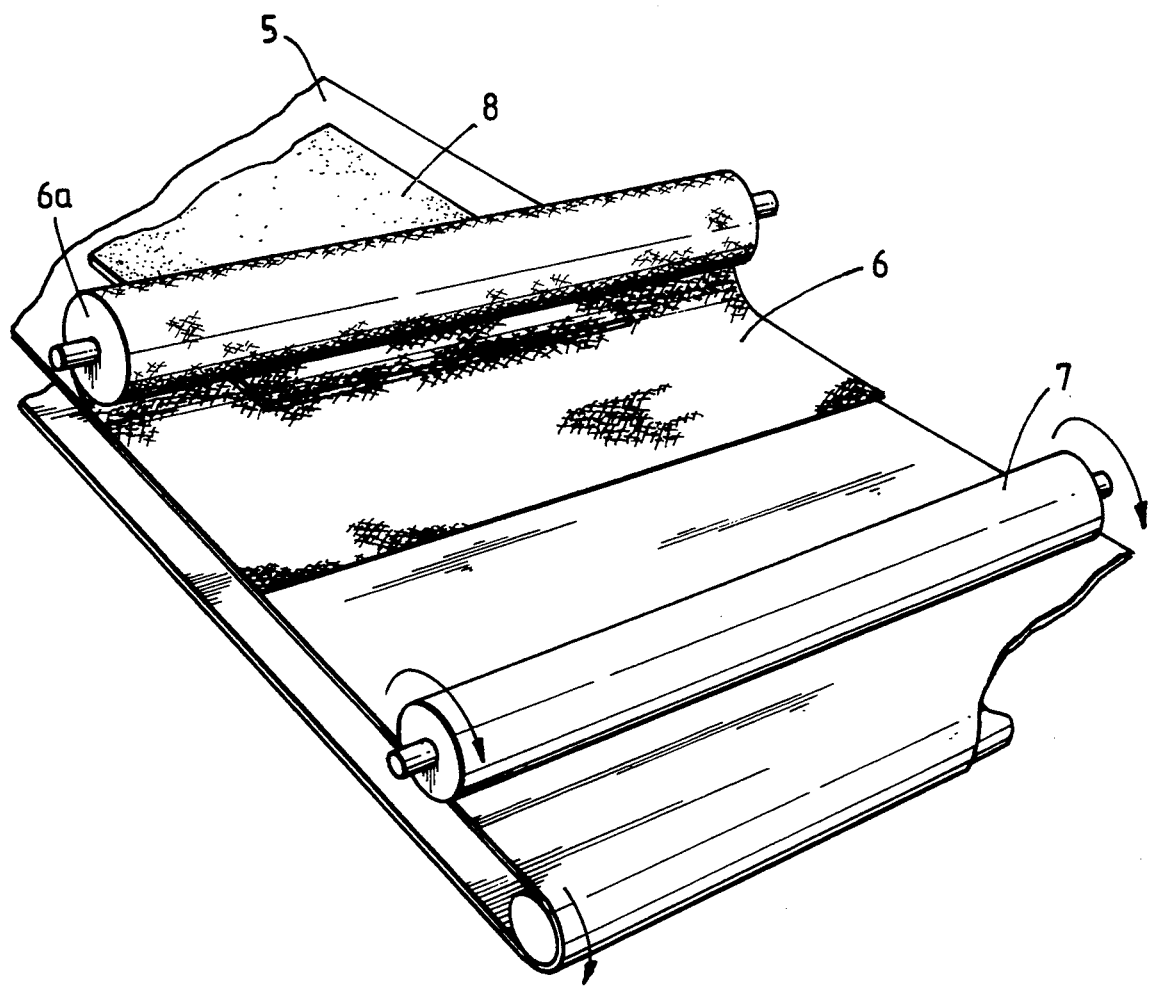
FIG. 4 is a perspective view of a device for effecting winding of a sheet of dough.

Referring to FIG. 4, the device comprises a transport belt 5, above which is located a stainless steel flexible chain mail 6, on a roll 6a, the chain mail having a leading edge which extends downwards in the direction of movement of a belt, and a motor driven rotor 7, which rotates counterwise with respect to the direction of the belt. The roll 6a rotates to vary the free length of chain mail under which the dough sheet passes. It does not, however, rotate when the device is in operation. In use, a dough sheet 8 is arranged on the belt 5 at a position remote from the chain mail and rotor. The belt transports the dough sheet to the chain mail, which effects initial coiling of the dough sheet. The partially coiled dough sheet is then transported to the rotor which effects further coiling thereof.

EXAMPLE 1

A dough comprising the following ingredients was prepared

|  | by weight |
| --- | --- |
| medium strength flour | 51.9% |
| skimmed milk powder | 1.9% |
| sugar | 1.5% |
| salt | 1.0% |
| fresh yeast | 2.1% |
| shortening fat | 10.7% |
| water | balance |

It was prepared by adding the yeast to the luke warm water to obtain a liquid of 25° C. and thereafter adding the remaining ingredients except for the shortening fat. The mix was vigorously stirred for 6 minutes. The dough was extruded into a sheet having a thickness of 12 mm and combined with the fat and laminated in two half turns. The laminate was rolled out to a thickness of 3 mm. The sheet was wound into a cylindrical log shape having a diameter of about 10 cm. The log was sliced perpendicular to the direction of its length to obtain slices having a thickness of about 2 cm. The slices were rolled to obtain a base having a thickness of about 3 mm and a diameter of about 20 cm and proved for 40 minutes at 37.5 in a 60% relative humidity atmosphere. The base was pre-baked in a conventional oven at 230° C. for 5–6 minutes. A pizza topping was applied to the pre-baked base by first applying a pizza sauce and subsequently a particulate cheese and vegetable material. The pizza was wrapped in a moisture-impermeable bag and stored under freezing conditions for about 4 weeks. The product was prepared for consumption by oven baking at 200° C. for 15 minutes.

The mouthfeel of the final product was attractively non-fatty. Attractive crispness was noticed, due to the breaking of the structure of the base along the planes of weakness. The products were perceived by consumers to have an interesting contrasting texture, which had a bread-like texture on its inside and was crispy on its external surface, and were generally positively received.

We claim:

1. Method of preparing a dough product comprising the steps of:
   (a) preparing a laminated, farinaceous dough, wherein said laminated farinaceous dough comprises less than 10 fat layers between farinaceous dough layers;
   (b) forming one or more sheets of said laminated farinaceous dough into a layered body;
   (c) slicing said layered body at an acute angle of 25° or greater with respect to said laminated farinaceous dough layers to obtain a formed slice having its layers in a direction substantially perpendicular to the surface produced by the slice; and
   (d) pressing said formed slice such that planes of weakness are maintained between individual layers.

2. Method according to claim 1, comprising the spiral winding of one or more sheets of dough to from a body in a cylindrical log shape.

3. Method according to claim 1, comprising the additional step of applying a filling or topping to the sliced and pressed dough product.

4. Dough product comprising a slice of dough having more than 10 laminated farinaceous dough layers, wherein said laminated farinaceous dough layers are sliced at an acute angle of 25° or greater with respect to a surface provided by said slice having its layers in a direction substantially perpendicular to the surface produced by the slice and said slice is pressed such that planes of weakness are maintained between individual layers, said laminated farinaceous dough layers each comprising less than 10 fat layers between farinaceous dough layers.

5. Dough product according to claim 4 being a pizza.

* * * * *